United States Patent
Claudatos et al.

(10) Patent No.: US 8,605,878 B2
(45) Date of Patent: Dec. 10, 2013

(54) REDIRECTING AND MIRRORING OF TELEPHONIC COMMUNICATIONS

(75) Inventors: Christopher Claudatos, San Jose, CA (US); William D. Andruss, Minneapolis, MN (US)

(73) Assignee: EMC Corporation, Hopkinton, MA (US)

( * ) Notice: Subject to any disclaimer, the term of this patent is extended or adjusted under 35 U.S.C. 154(b) by 1916 days.

(21) Appl. No.: 11/173,949

(22) Filed: Jun. 30, 2005

(65) Prior Publication Data

US 2007/0025536 A1 Feb. 1, 2007

(51) Int. Cl.
*H04M 3/00* (2006.01)
*H04M 3/42* (2006.01)

(52) U.S. Cl.
USPC ...................................... 379/198; 379/211.01

(58) Field of Classification Search
USPC ............... 379/88.17, 88.19, 88.22, 198, 199, 379/211.01
See application file for complete search history.

(56) References Cited

U.S. PATENT DOCUMENTS

| | | |
|---|---|---|
| 5,416,831 A | 5/1995 | Chewning et al. |
| 5,432,845 A | 7/1995 | Burd et al. |
| 5,493,692 A | 2/1996 | Theimer et al. |
| 5,557,655 A | 9/1996 | Lantto |
| 5,590,171 A | 12/1996 | Howe et al. |
| 5,627,764 A | 5/1997 | Schutzman et al. |
| 5,784,561 A | 7/1998 | Bruno et al. |
| 5,796,948 A | 8/1998 | Cohen |
| 5,839,067 A | 11/1998 | Jonsson |
| 5,878,351 A | 3/1999 | Alanara et al. |
| 5,881,132 A * | 3/1999 | O'Brien et al. ............... 379/230 |
| 5,890,064 A | 3/1999 | Widergen et al. |
| 5,890,163 A | 3/1999 | Todd |
| 5,983,096 A | 11/1999 | Lietha et al. |
| 6,028,917 A | 2/2000 | Creamer et al. |
| 6,064,963 A | 5/2000 | Gainsboro |
| 6,085,099 A | 7/2000 | Ritter et al. |
| 6,085,231 A | 7/2000 | Agraharam et al. |
| 6,112,078 A | 8/2000 | Sormunen et al. |
| 6,128,739 A | 10/2000 | Fleming, III |
| 6,141,686 A | 10/2000 | Jackowski et al. |
| 6,163,546 A | 12/2000 | Sipila |
| 6,167,513 A | 12/2000 | Inoue et al. |

(Continued)

FOREIGN PATENT DOCUMENTS

| | | |
|---|---|---|
| CN | 1303184 A | 7/2001 |
| CN | 1072420 C | 10/2001 |

(Continued)

OTHER PUBLICATIONS

U.S. Appl. No. 10/936,439, filed Sep. 7, 2004, Claudatos et al.

(Continued)

*Primary Examiner* — Ahmad F Matar
*Assistant Examiner* — Nafiz E Hoque
(74) *Attorney, Agent, or Firm* — Van Pelt, Yi & James LLP

(57) ABSTRACT

Initiating a communication is disclosed. An identifier associated with an intended destination with which the calling party desires to establish communication is received from a calling party. Communication with a compliance node is established. An identifier is provided to the compliance node. The compliance node is configured to establish with the intended destination a communication session in which the compliance node, the intended destination, and the calling party are participants.

26 Claims, 12 Drawing Sheets

(56) References Cited

U.S. PATENT DOCUMENTS

| | | |
|---|---|---|
| 6,249,584 B1 | 6/2001 | Hamalainen et al. |
| 6,301,608 B1 | 10/2001 | Rochkind |
| 6,311,055 B1 | 10/2001 | Boltz |
| 6,313,734 B1 | 11/2001 | Weiss et al. |
| 6,327,343 B1 | 12/2001 | Epstein et al. |
| 6,442,595 B1 | 8/2002 | Kelly |
| 6,442,686 B1 | 8/2002 | McArdle et al. |
| 6,487,586 B2 | 11/2002 | Ogilvie et al. |
| 6,522,727 B1 | 2/2003 | Jones |
| 6,609,138 B1 | 8/2003 | Merriam |
| 6,643,684 B1 | 11/2003 | Malkin et al. |
| 6,647,255 B1 | 11/2003 | Nilsson |
| 6,668,044 B1 | 12/2003 | Schwartz et al. |
| 6,675,017 B1 | 1/2004 | Zellner et al. |
| 6,678,516 B2 | 1/2004 | Nordman et al. |
| 6,694,436 B1 | 2/2004 | Audebert |
| 6,714,791 B2 | 3/2004 | Friedman |
| 6,721,416 B1 | 4/2004 | Farrell |
| 6,721,785 B1 | 4/2004 | Raghunandan |
| 6,760,421 B2 * | 7/2004 | Heilmann et al. ............ 379/189 |
| 6,765,996 B2 | 7/2004 | Baxter, Jr. |
| 6,779,022 B1 | 8/2004 | Horstmann et al. |
| 6,785,704 B1 | 8/2004 | McCanne |
| 6,826,609 B1 | 11/2004 | Smith et al. |
| 6,829,349 B1 | 12/2004 | Neale et al. |
| 6,829,635 B1 | 12/2004 | Townshend |
| 6,868,498 B1 | 3/2005 | Katsikas |
| 6,870,924 B1 | 3/2005 | Ukon |
| 6,901,445 B2 | 5/2005 | McCanne et al. |
| 6,920,209 B1 * | 7/2005 | Gainsboro .................... 379/199 |
| 6,963,638 B1 * | 11/2005 | Keller ........................... 379/229 |
| 7,020,779 B1 | 3/2006 | Sutherland |
| 7,031,437 B1 | 4/2006 | Parsons et al. |
| 7,089,594 B2 | 8/2006 | Lal et al. |
| 7,106,850 B2 | 9/2006 | Campbell et al. |
| 7,133,898 B1 | 11/2006 | Malik |
| 7,155,243 B2 | 12/2006 | Baldwin et al. |
| 7,230,951 B2 | 6/2007 | Mizell et al. |
| 7,260,384 B2 | 8/2007 | Bales et al. |
| 7,286,834 B2 | 10/2007 | Walter |
| 7,299,263 B2 | 11/2007 | Claudatos et al. |
| 7,330,717 B2 | 2/2008 | Gidron et al. |
| 7,392,297 B2 | 6/2008 | Ozaki et al. |
| 7,450,937 B1 | 11/2008 | Claudatos et al. |
| 7,457,404 B1 | 11/2008 | Hession et al. |
| 7,472,163 B1 | 12/2008 | Ben-Yoseph et al. |
| 7,489,947 B2 | 2/2009 | Castrogiovanni et al. |
| 7,650,140 B2 | 1/2010 | Plumb et al. |
| 7,680,511 B2 | 3/2010 | Forte |
| 7,715,819 B2 | 5/2010 | Rockwell |
| 7,725,098 B1 | 5/2010 | Claudatos et al. |
| 8,086,255 B2 | 12/2011 | Claudatos et al. |
| 8,126,133 B1 | 2/2012 | Everingham et al. |
| 2001/0043697 A1 | 11/2001 | Cox et al. |
| 2002/0037075 A1 | 3/2002 | Flanagan |
| 2002/0054587 A1 | 5/2002 | Baker et al. |
| 2002/0090073 A1 * | 7/2002 | Heilmann et al. ............ 379/198 |
| 2002/0107950 A1 | 8/2002 | Lu |
| 2002/0138652 A1 | 9/2002 | Taylor |
| 2002/0147734 A1 | 10/2002 | Shoup et al. |
| 2002/0165969 A1 * | 11/2002 | Gallant ......................... 709/227 |
| 2002/0198950 A1 | 12/2002 | Leeds |
| 2003/0008662 A1 | 1/2003 | Stern et al. |
| 2003/0032409 A1 | 2/2003 | Hutcheson et al. |
| 2003/0087638 A1 | 5/2003 | Taylor |
| 2003/0110212 A1 | 6/2003 | Lewis |
| 2003/0219103 A1 | 11/2003 | Rao et al. |
| 2003/0231207 A1 | 12/2003 | Huang |
| 2004/0066916 A1 * | 4/2004 | Brown et al. .............. 379/88.01 |
| 2004/0153499 A1 | 8/2004 | Heddaya et al. |
| 2004/0170268 A1 | 9/2004 | Hakusui |
| 2004/0176080 A1 | 9/2004 | Chakravorty et al. |
| 2004/0198454 A1 * | 10/2004 | Chavez et al. ................ 455/565 |
| 2004/0208304 A1 * | 10/2004 | Miller ...................... 379/210.02 |
| 2004/0244102 A1 | 12/2004 | Benzon et al. |
| 2004/0259534 A1 | 12/2004 | Chaudhari et al. |
| 2005/0018622 A1 | 1/2005 | Halbraich et al. |
| 2005/0031107 A1 | 2/2005 | Fotta |
| 2005/0053084 A1 | 3/2005 | Abrol et al. |
| 2005/0069096 A1 | 3/2005 | Claudatos et al. |
| 2005/0141674 A1 * | 6/2005 | Brown et al. .............. 379/32.01 |
| 2005/0226221 A1 | 10/2005 | Fotta et al. |
| 2006/0043164 A1 | 3/2006 | Dowling et al. |
| 2006/0099965 A1 | 5/2006 | Aaron |
| 2006/0135140 A1 | 6/2006 | Rothman et al. |
| 2006/0148495 A1 | 7/2006 | Wilson |
| 2006/0168003 A1 | 7/2006 | Vau et al. |
| 2008/0292070 A1 | 11/2008 | Winter et al. |
| 2008/0311905 A1 | 12/2008 | Noldus et al. |
| 2010/0115038 A1 | 5/2010 | McEachern et al. |
| 2010/0159883 A1 | 6/2010 | Pascal et al. |

FOREIGN PATENT DOCUMENTS

| | | |
|---|---|---|
| CN | 1342278 A | 3/2002 |
| EP | 1083765 A2 | 3/2001 |
| WO | 00556015 A1 | 9/2000 |
| WO | WO 01/76181 | 10/2001 |

OTHER PUBLICATIONS

U.S. Appl. No. 10/936,443, filed Sep. 7, 2004, Claudatos et al.
U.S. Appl. No. 10/936,442, filed Sep. 7, 2004, Claudatos et al.
U.S. Appl. No. 11/173,174, filed Jun. 30, 2005, Claudatos et al.
U.S. Appl. No. 10/884,453, filed Jul. 1, 2004, Claudatos et al.
U.S. Appl. No. 10/884,477, filed Jul. 1, 2004, Claudatos et al.
U.S. Appl. No. 10/884,345, filed Jul. 1, 2004, Claudatos et al.
U.S. Appl. No. 10/884,473, filed Jul. 1, 2004, Claudatos et al.
U.S. Appl. No. 11/174,288, filed Jun. 30, 2005, Claudatos et al.
U.S. Appl. No. 11/173,949, filed Jun. 30, 2005, Claudatos et al.
U.S. Appl. No. 60/500,453, filed Sep. 5, 2003, Claudatos.
"Method for Preclude Unauthorized Sending or Forwarding of Mail Items" IBM Technical Disclosure Bulletin, IBM Corp. New York, US, vol. 37, No. 3, Mar. 1, 1994, p. 199, XP000441437, ISSN: 0018-8689.
Legato, Email Management Solutions, The EmailXtender Family, 2004, http://www.legato.com/products/emailxtender/.
Legato, EmailXtender Archive Edition, Email Archiving Software, 2004, http://www.legato.com/products/emailxtender/emailarchive.cfm.
Legato, EmailXaminer, Email Monitoring Software, EmailXaminer the Email Compliance Manager, 2004, http://www.legato.com/products/emailxtender/emailxaminer.cfm.
Emma™ E-Mail Monitoring Archive, 2004, http://elstore.com/emmamain.html.
U.S. Appl. No. 11/174,288, filed Jun. 30, 2005, Schwartz et al.

\* cited by examiner

_(12)_ United States Patent

REDIRECTING AND MIRRORING OF TELEPHONIC COMMUNICATIONS

BACKGROUND OF THE INVENTION

In many contexts, an enterprise or other stakeholder may be required and/or may desire to keep track of and/or exercise control over network or other communications, e.g., communications among employees of a corporation and/or between such employees and third parties, such as the corporation's customers and/or members of the general public. The requirements of the Securities and Exchange Commission, National Association of Securities Dealers, HIPAA, Sarbanes-Oxley Act of 2002, and various anti-harassment and anti-discrimination laws are among the many legal and regulatory requirements that may give rise to a need on the part of a corporation or other entity to be able to monitor, record, archive, index, retrieve, analyze, and/or control employee (or other user) communications.

The task of monitoring and controlling voice communications has been challenging. Not only has voice communication processing technology been traditionally limited, voice communication typically involves the use of communication devices and/or infrastructure beyond the control of the responsible entity. Therefore, there is a need for an effective way to monitor and/or control voice and other communications, including without limitation communications made using telephonic technology.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Telephonic communication redirection and mirroring is disclosed. In some embodiments, calls to and/or from one or more communication participants of interest are redirected through a compliance system accessible via a telephonic network, e.g., a telephone/cellular service provider network. A communication participant includes any users, systems, and/or devices involved in a communication. In some embodiments, a compliance system is configured to serve as a redirection point for calls associated with a communication participant of interest, thereby enabling various routing and compliance processing to be performed without necessarily involving a change in a third party telecommunications service provider's network or equipment. In some embodiments, data associated with a call in which a communication participant of interest is a participant is mirrored to a mirror destination node, e.g., for policy or regulatory compliance processing.

Figure 1:
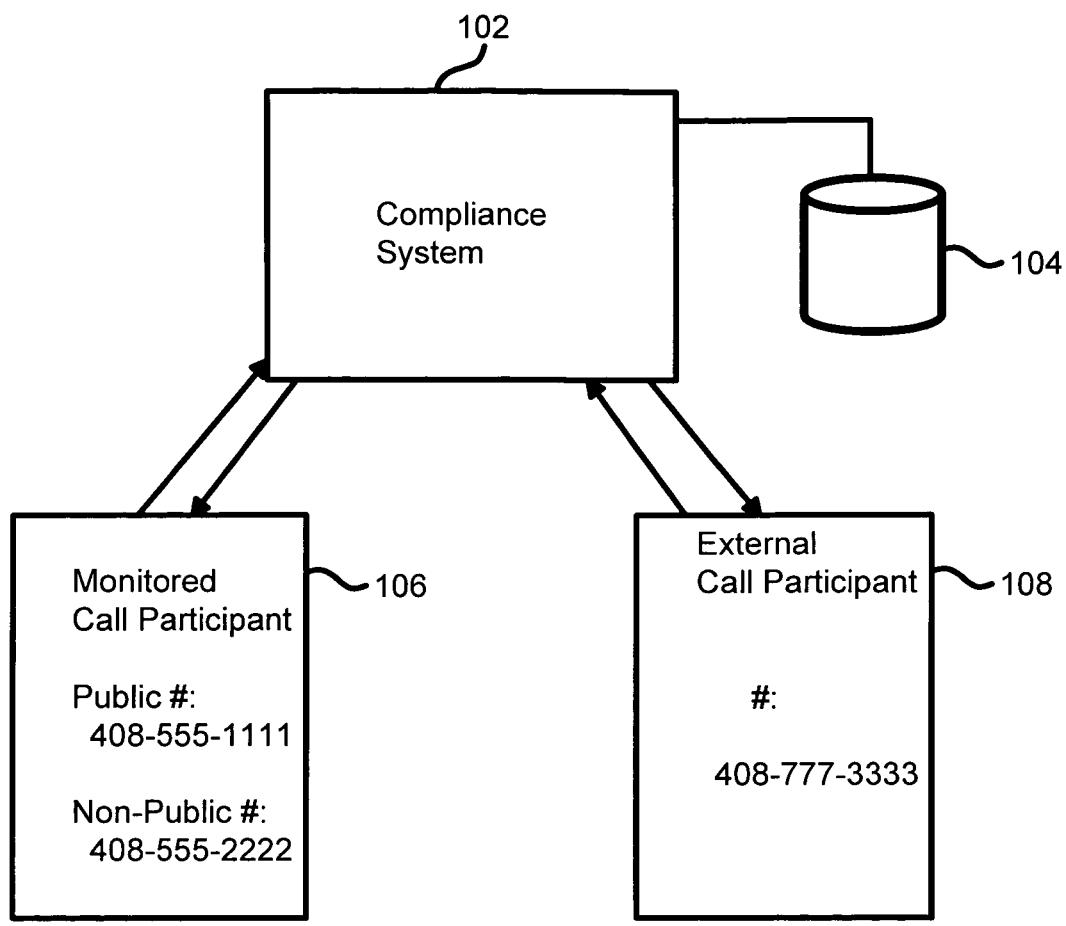
FIG. 1 is a block diagram illustrating an embodiment of a system for redirection compliance processing.

FIG. 1 is a block diagram illustrating an embodiment of a system for redirection compliance processing. In the example shown, compliance system 102 performs routing and compliance processing. Storage 104 contains data associated with the compliance system. The data in storage 104 may include call archive data, recorded call data, and any information associated with calls. Configuration and policy data and/or settings may also be stored in storage 104. Monitored call participant 106 is one of one or more communication participants associated with compliance system 102. In some embodiments, all calls to and from monitored call participant 106 are redirected through compliance system 102. Call participant 106 in one embodiment comprises a communication device associated with an employee of a company desiring to perform compliance processing of telephonic communication of its employees. External call participant 108 is one of one or more communication participants that may communicate with monitored call participant 106. More than two call participants can exists, e.g., a conference call with 3 or more call participants, and more than one monitored call participant may participate in the same call. In the example shown, the external call participant 108 is external to the compliance system since the call participant is not directly associated with the compliance system, e.g., the communication participant does not belong to the company desiring to perform compliance processing of monitored call participant 106. Only calls involving at least one monitored call participant are processed by compliance system 102. In some embodiments, monitored call participant 106 may communicate with another monitored call participant associated with compliance system 102. The communication information path lines shown in the figure are merely schematic. Not all information paths have been shown to clearly illustrate the embodiment. Information may travel through any path or network and travel through any intermediary node.

In the example shown, monitored call participant 106 has a public call number and a non-public call number. The call numbers are used as identifiers of call participants. A call number may be a telephone number, extension number, IP address, and any numeric, alphabetic, alphanumeric or other identifier. In some embodiments, the public call number associated with monitored call participant 106 would be provided to one or more external calling parties or users, such as external call participant 108, to be used to place a call to the monitored call participant 106. In some embodiments, dialing the public call number associated with monitored call participant 106 results in a call being placed to compliance system 102, which is configured to recognize the call as being associated with monitored call participant 106 and establish a three way connection between the calling party (e.g., external call participant 108), the monitored call participant 106, and the compliance system 102, e.g., by using the non-public call number associated with monitored call participant 106 to conference monitored call participant 106 in to the call terminated between external call participant 108 and compliance system 102, thereby enabling the compliance system 102 to monitor and/or control the communications between external call participant 108 and monitored call participant 106. In some embodiments, a calling party includes any user, a hardware component, or a software component associated with a call participant.

In some embodiments, dialing the public call number associated with the monitored call participant 106 results in a call placed directly to call participant 106. Compliance processing is performed either in a compliance processing module of call participant 106 or an external compliance system associated with call participant 106. In some embodiments, call participant 106, upon receiving an incoming call, e.g., from an external call participant, first conferences in an associated compliance system prior to connecting a user associated with call participant 106 to the call, e.g., by providing a "ring" signal or indication to the user.

In some embodiments, the user of a device associated with monitored call participant 106 is not made aware of the non-public call number. In some embodiments, the user associated with monitored call participant 106 believes the public call number is the only call number associated with monitored call participant 106.

In some embodiments, when monitored call participant 106 dials an outgoing destination call number, a call is established with compliance system 102 and the outgoing destination call number is passed to the compliance system. The compliance system terminates a new call to the passed destination number and conferences the monitored call participant 106 with the terminated new call to the passed destination number. In some embodiments, telecommunication equipment associated with monitored call participant 106, e.g., a mobile or desktop telephone, is configured to only receive calls to the non-public number from compliance system 102 and make direct calls only to compliance system 102. In some embodiments, only one or more authorized call participants may dial the private number associated with a monitored call participant in a call and communicate with the associated monitored call participant during the call. An attempt to dial the private number in a call by an unauthorized caller may result in the call being blocked or the call being unanswered. In some embodiments, monitored call participant 106 can only directly dial calls to one or more numbers associated with authorized call participants. A compliance system may be an authorized call participant.

In some embodiments, hardware, firmware, or software may be used to limit equipment associated with monitored call participant 106 to placing calls directly to and/or receiving calls at the non-public number from compliance system 102. In some embodiments, hardware, firmware, or software may be used to limit equipment associated with monitored call participant 106 to placing calls directly to and/or receiving calls from authorized call participants. In some embodiments, hardware, firmware, or software may be used to cause equipment associated with monitored call participant 106 to connect, automatically and transparently to the user, a compliance node by conference into a call placed using the equipment. In some embodiments, hardware, firmware, or software may be used to cause equipment associated with monitored call participant 106 to mirror to a compliance node, automatically and transparently to the user, at least a portion of data associated with a call placed using the equipment.

In some embodiments, call requester identifier data (i.e., Caller-ID data) is modified to allow the call participants to be unaware of the call redirections, e.g., by sending Caller ID data associated with external call participant 108 to equipment associated with monitored call participant 106 in connection with the call terminated by compliance system 102 to monitored call participant 106, e.g., using the non-public call number associated with monitored call participant 106, to conference monitored call participant 106 in to the call original terminated between external call participant 108 and compliance system 102, e.g., as a result of external call participant 108 dialing the public call number associated with monitored call participant 106.

Since compliance system 102 in some embodiments redirects all incoming and outgoing calls for monitored call participant 106, the compliance system is able to perform compliance processing on all calls associated with monitored call participant 106. In other embodiments, at least a portion of call data may be received by compliance system 102, e.g., by mirroring and/or conferencing as described above, and compliance processing is performed on such data.

Any telephonic equipment may be associated with the call participants. For example, the call participants may be associated with mobile phones, telephones, computers, and/or any devices able to send and receive telephonic data. Any one or a combination of telecommunications networks may be used to transmit communication between the compliance system and the call participants, including without limitation, a direct or indirect physical connection, telephone service provider network, mobile communication network, public switched telephone network (PSTN), Blackberry network, PBX (Private Branch Exchange, i.e., a private telephone network within an enterprise) phone network, Voice-over-IP network, Internet, intranet, LAN, WAN, and/or any other forms of connecting two or more systems together. The telephone service provider network includes mobile communication network, public switched telephone network (PSTN), Blackberry network, Voice-over-IP network and/or any other forms of telecommunication network infrastructure. In some embodiments, monitored call participant 106 is configured to communicate with compliance system 102 by modifying or otherwise configuring firmware associated with monitored call participant 106 to perform such communication. In one embodiment, a communication policy, i.e. a policy regarding how to establish communication with other call participants, may be established and/or implemented by hardware design or modification of telecommunications equipment associated with monitored call participant 106. In one embodiment, the communication policy may be determined by software running on a processor associated with monitored call participant 106. Any suitable technique for enabling, determining, configuring, and/or enforcing may be used.

In some embodiments, compliance system 102 includes any component necessary to perform redirection and/or compliance processing. One or more telephonic identifiers, including telephone numbers, extension numbers, IP numbers, and numeric, alphabetic or alphanumeric identifier, may be associated with compliance system 102. Storage 104 may be a part of the compliance system or connected to the compliance system together through a connection or a network. The compliance system and a device associated with a monitored call participant may together comprise a single device, i.e., in one embodiment a telephone associated with the monitored call participant includes built-in compliance system processing inside the device. In some embodiments, compliance processing performed in a compliance processing module that is a part of a monitored call participant. In some embodiments, compliance processing is performed in an external compliance processing module connected with a monitored call participant. The external compliance system may not perform call redirection. In some embodiments, the monitored call participant only accepts or makes calls if the external compliance system approves the call.

Compliance processing may include processing based on at least a portion of the information transferred in the call. Information transferred in the call may include voice data (including conversation content and tone/character/accent/gender of voice), background call noise, any audible data, any binary data, data associated with devices of with call participants, data associated with communication service providers, data associated with routing devices, and/or data associated with other devices associated with the compliance system. Based at least in part on the information being processed, the calls may be monitored, recorded, indexed, retrieved, analyzed, controlled, blocked, modified, archived, and/or any other processing can be performed. In some embodiments, a call is blocked according to a call blocking policy, e.g., a call is blocked if one of the call participants is not on a list of allowed call participants, does not belong to a group of allowed call participants, is an external call participant, is on a list of non-allowed call participants, or belongs to a group of non-allowed call participants. A call may be blocked or modified during a call. For example, in one embodiment a call is terminated if information that violates a policy is discussed, as detected during the call by processing voice data communicated during the call, e.g., by detecting a key word or phrase. The blocked or modified call can be archived and reported to appropriate authorities. Audio data processing is described in greater detail in a U.S. patent application Ser. No. 10/884,453 entitled METHOD AND SYSTEM FOR PROCESSING AUDITORY COMMUNICATIONS filed Jul. 1, 2004.

In some embodiments, all or a portion of information transferred during a call may be archived. The determination of which transferred information portion to archive may be based at least in part on a preconfigured and/or dynamically configured archive policy. The policy may be based at least in part on any of the transferred information. Archiving includes saving transferred information to any storage medium, including hard drives, optical storage, data tape, audio tape, backup server, and networked storage (e.g., Storage Area Network, Network Attached Storage). In some embodiments, the storage may be a part of the compliance system and/or external to the compliance system. In some embodiments, the storage may be a part of a communication participant or may be external to the communication participant. Information may be converted (i.e. audio digitalization, voice to text translation, encoding format conversion, data filtering), compressed, and/or encrypted before being archived. Other compliance processing besides blocking, modifying, archiving may be performed by the compliance system.

Figure 2A:
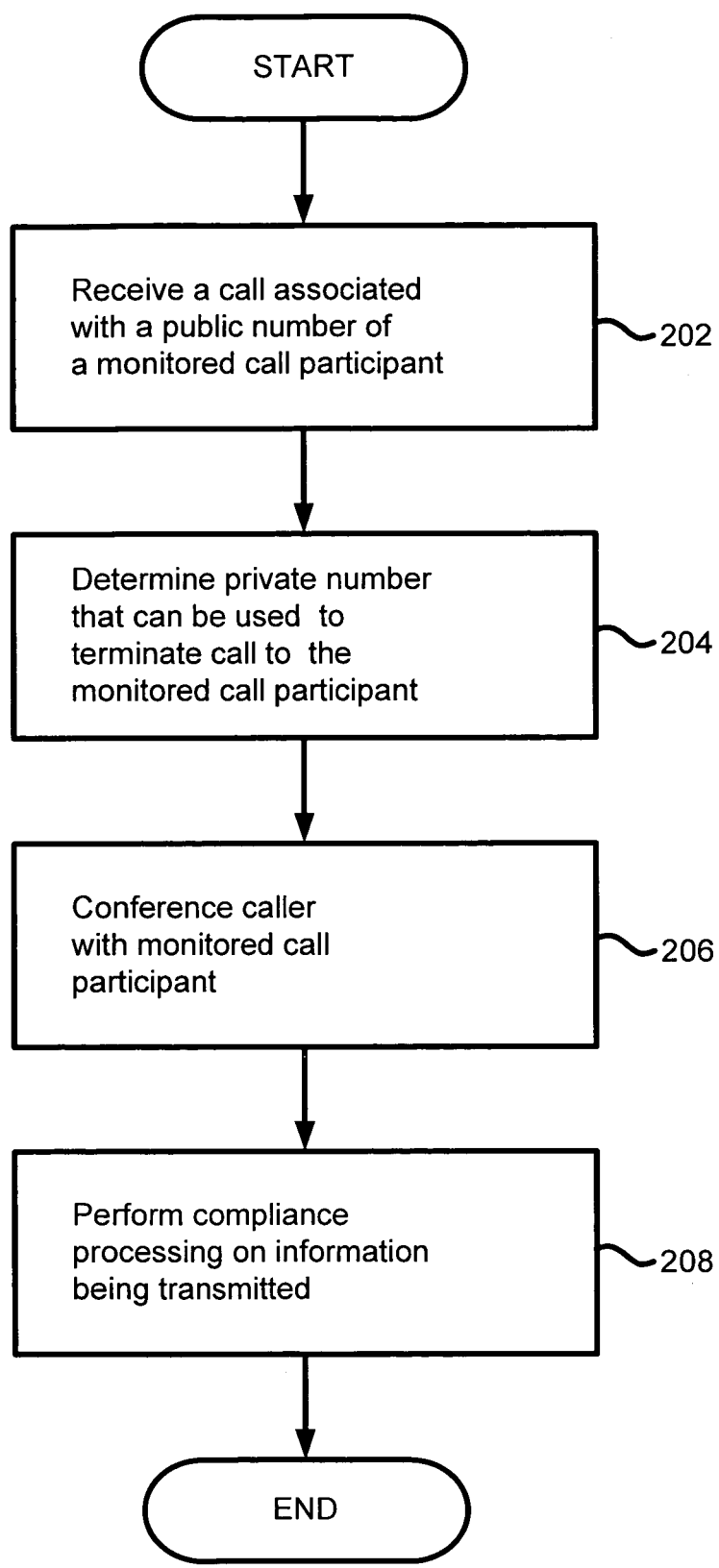
FIG. 2A is a flow chart illustrating an embodiment of a process for redirecting a call made to a monitored call participant.

FIG. 2A is a flow chart illustrating an embodiment of a process for redirecting a call made to a monitored call participant. The process may be implemented on compliance system 102 of FIG. 1. At 202, a call associated with a public number of a monitored call participant associated with a compliance system is received. In some embodiments, the call is received at a compliance system on a line associated with the public number, e.g., calls made to the public number ring at and/or otherwise are connected by a telephone service provider to the compliance system. At 204, a non-public number that can be used to terminate the call to the monitored call participant is determined. At 206, the non-public number is used to conference the monitored call participant into the call received at 202, which in some embodiments results in a three way call being established between a calling station that initiated the call received at 202, the compliance system, and the monitored call participant. At 208, compliance processing is performed on the information transferred between the caller and the monitored call participant either during the communication or after the communication session.

Figure 2B:
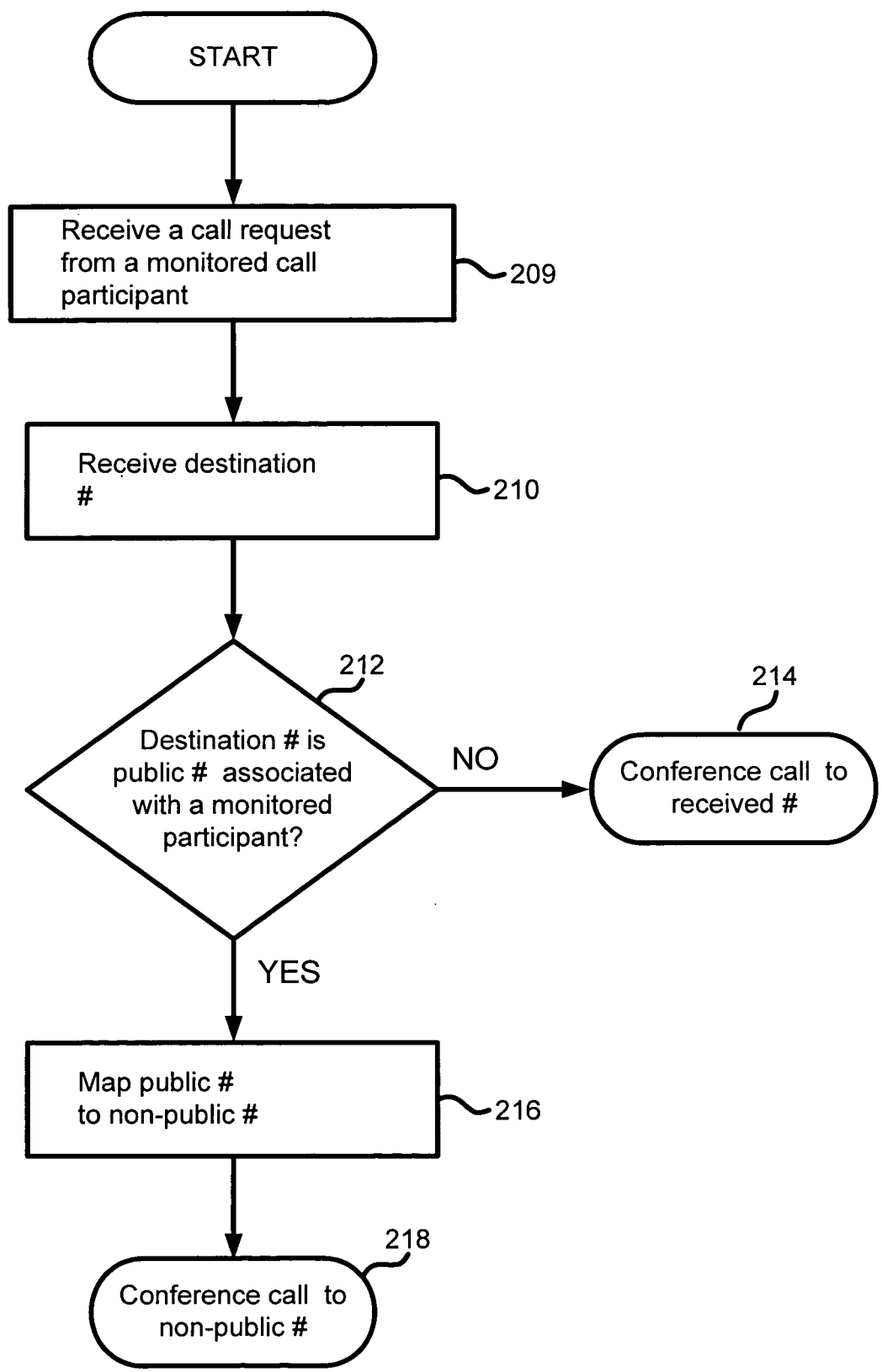
FIG. 2B is a flow chart illustrating an embodiment of a process for redirecting a call made from a monitored call participant.

FIG. 2B is a flow chart illustrating an embodiment of a process for redirecting a call made from a monitored call participant. The process may be implemented on compliance system 102 of FIG. 1. At 209, a call request from a monitored call participant is received. For example, the monitored call participant may call the compliance system to establish a call between them. One or more dedicated call numbers for incoming call requests from monitored call participants may be associated with the compliance system. In some embodiments, the monitored call participant may dial a number associated with the compliance system. In some embodiments, the monitored call participant may use a telephone configured to connect to the compliance system regardless of the number dialed and then pass the dialed digits to the compliance system for further processing, e.g., conferencing the dialed number into the call and monitoring the information exchanged between the monitored call participant and the destination associated with the dialed number. At 210, the destination call participant number (i.e. number dialed by the monitored call participant) is received from the monitored call participant. The call number may be passed as a single or a combination of data encodings, including rotary pulse, DTMF (Dual-Tone Multi-Frequency), and binary data. A connection between the monitored call participant and the compliance system may be established at or shortly after the time the number is dialed or a connection between them may already exist. In some embodiments, a handshake protocol is used to establish communication. At 212, it is determined whether the dialed number is a public number associated with a monitored call participant associated with the compliance system. If dialed number is not a public number associated with a monitored participant, at 214 the dialed number is used to conference the destination call participant into the call received at 209. If it is determined at 212 that the received destination number is a public number associated with a monitored participant, at 216 the destination public number is mapped to a non-public number of the call participant associated with the destination number. At 218, the non-public number of the call participant associated with the destination number is used to conference the call participant associated with the destination number into the call received at 209.

Figure 2C:
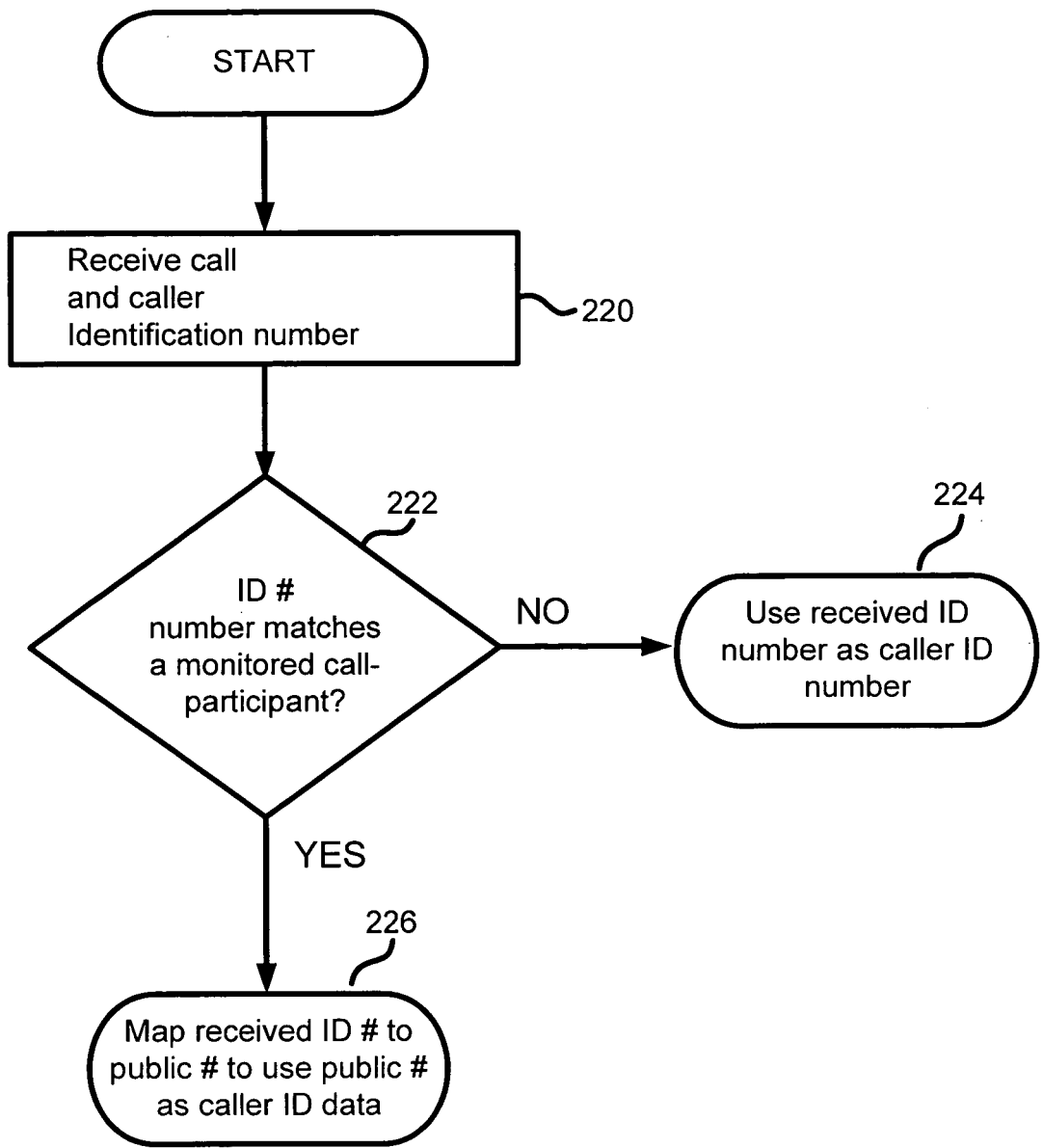
FIG. 2C is a flow chart illustrating an embodiment of a process for determining an identification number to be used in connection with a monitored call.

FIG. 2C is a flow chart illustrating an embodiment of a process for determining an identification number to be used in connection with a monitored call. In some embodiments, identification number is a Caller ID number to be provided to a destination equipment to identify a call requester. The process may be implemented on a compliance system. At 220, a call and associated caller identification data are received. If at 222 it is determined that the caller identification number received at 220 matches a monitored call participant's non-public number, at 226 the caller identification number is mapped to a public number associated with the same monitored call participant and the public number is used to identify the originator of the call received at 220, e.g., by providing the public number as a caller identification number in place of the caller identification number received at 220. If at 222 it is determined that the received caller identification number does not match a monitored call participant's non-public number, at 224 the caller identification number received at 220 is passed as the caller identification number.

Figure 2D:
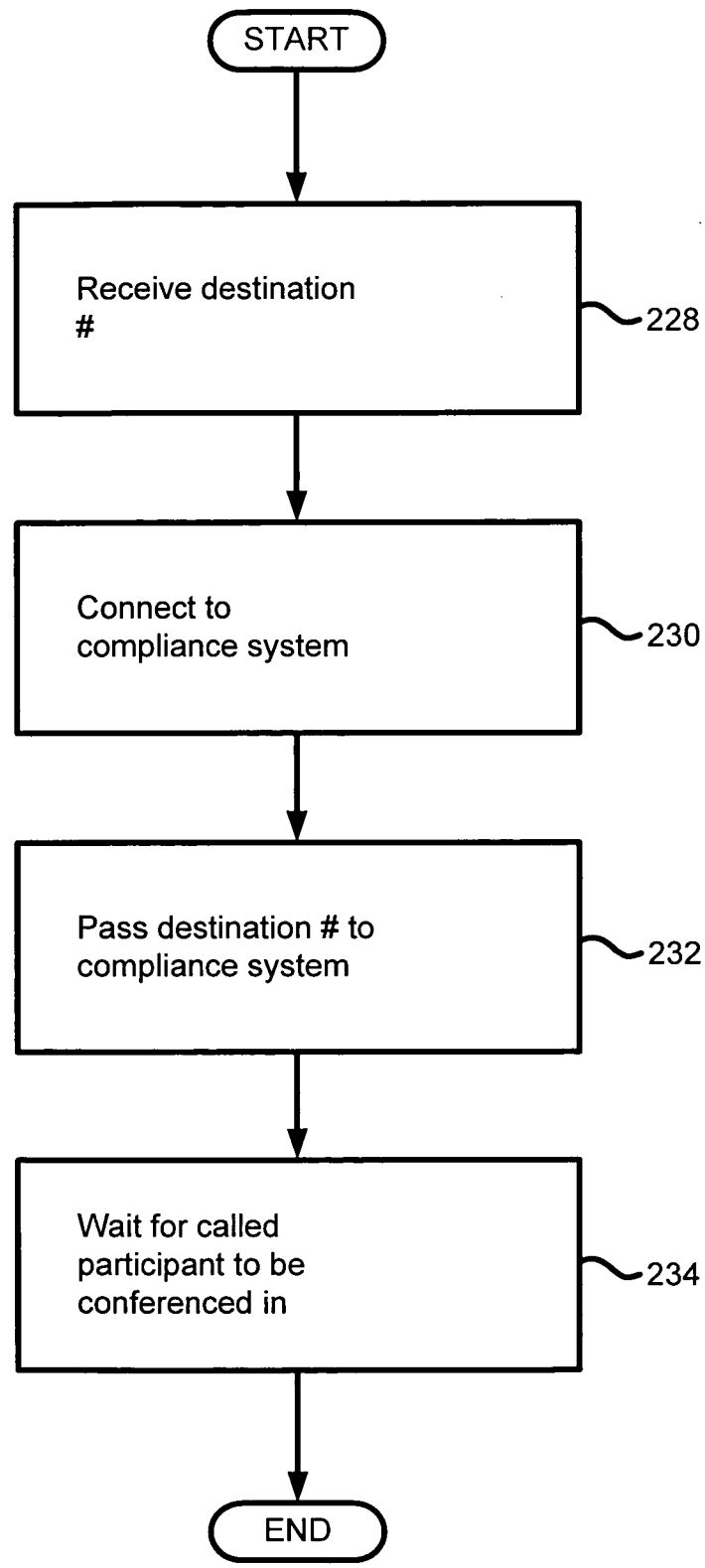
FIG. 2D is a flow chart illustrating an embodiment of a process for establishing a call to a destination call number.

FIG. 2D is a flow chart illustrating an embodiment of a process for establishing a call to a destination call number. The process may be implemented on a device associated with monitored call participant 106 of FIG. 1. At 228, the destination number is received. In some embodiments, the destination number may be received from a user associated with a monitored call participant, e.g., a number entered by the user using a keypad. At 230, a connection is established to the compliance system. In some embodiments, a call is made to the compliance system using a number associated with the compliance system. In some embodiments, the call to the compliance system is made transparently to a user associated with the monitored call participant. At 232, the destination number received at 228 is passed to the compliance system. At 234, the process waits for a called participant associated with the destination number to be conferenced in to the call. Once the called call participant has been conferenced in, the call initiator's call to the destination call number has been established and information can be exchanged between the initiator and the called call participant.

Figure 2E:
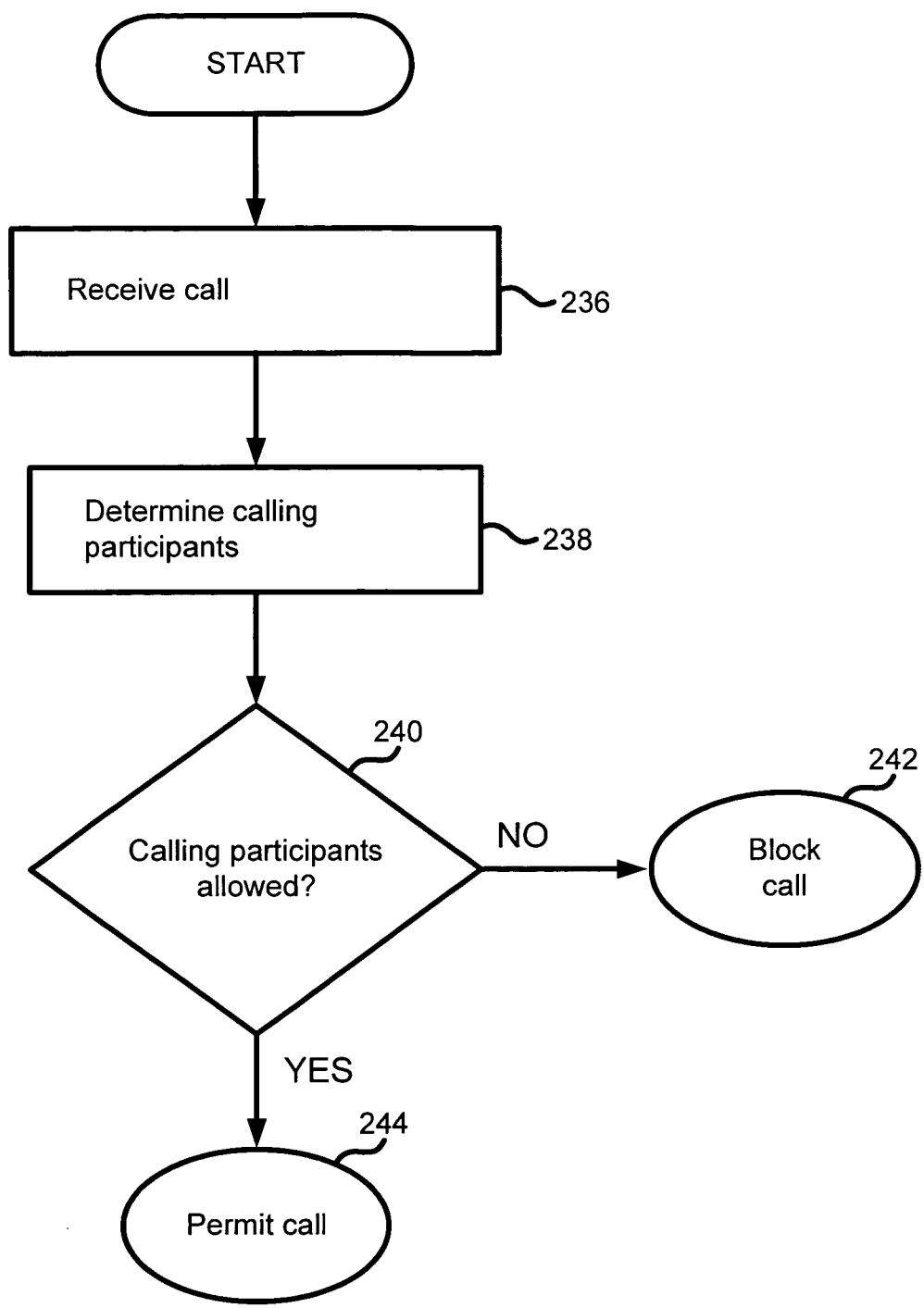
FIG. 2E is a flow chart illustrating an embodiment of a process for blocking a caller.

FIG. 2E is a flow chart illustrating an embodiment of a process for blocking a caller. The process may be implemented on a compliance system or communication equipment associated with a monitored call participant. At 236, a call is received. At 238, the call participants are determined. The calling participants are both the call initiator and the requested destination call participant. The call participants may be determined using caller identification data, requested destination call number, the line on which the call was received, and/or other data associated with the call. If at 240 it is determined that the calling participants are not allowed to communicate with each other, the call is blocked at 242. In some embodiment, the decision at 240 is governed by a blocking policy, including a list of allowed and/or blocked call participants. A call participant may be placed on the list if the call participant had previously violated a communication policy. For example, if during a call a communication participant communicates keywords that violate the communication policy, the call is terminated and the communication participant is placed on a blocked list. Call participants may be added or removed from one or more lists by a user with modification privileges. Blocking a call may include one or more of the following: disconnecting the call, logging data associated with the blocked call request, and generating a notification of the blocked call. If at 240 it is determined that the calling participants are allowed to communicate with each other, at 244 the call is permitted.

Figure 3:
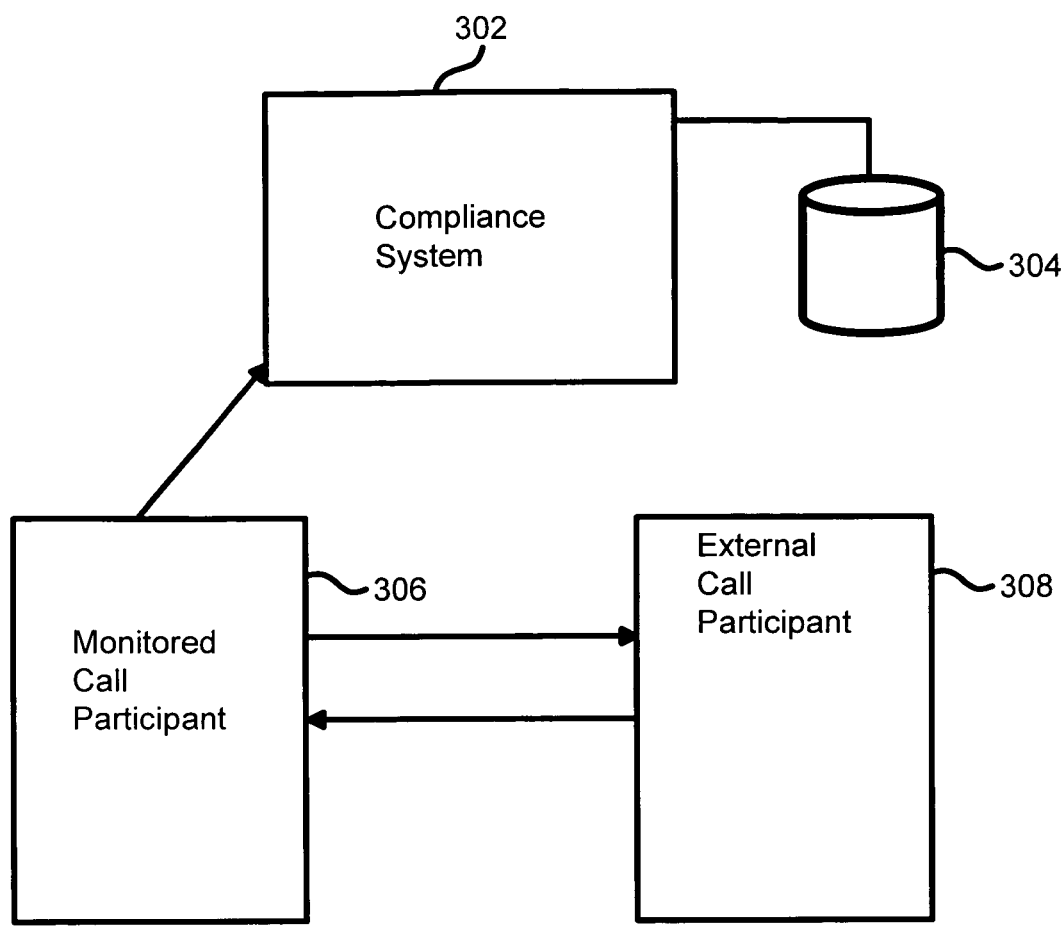
FIG. 3 is a block diagram illustrating an embodiment of a system for compliance processing.

FIG. 3 is a block diagram illustrating an embodiment of a system for compliance processing. Compliance system 302 performs compliance processing. Storage 304 contains data associated with the compliance system. Monitored call participant 306 is one of one or more communication participants associated with compliance system 302. Information associated with calls to and from monitored call participant 306 is provided to compliance system 302 for processing. External call participant 308 is one of one or more communication participants that may communicate with monitored call participant 306. More than two call participants can exist, e.g., a conference call involving 3 or more call participants. The external call participant is external to the compliance system since the call participant is not directly associated with the compliance system. In some embodiments, only information associated with calls involving at least one monitored call participant is processed by compliance system 302. In some embodiments, monitored call participant 306 may communicate with another monitored call participant associated with compliance system 302. The communication information path lines shown in the figure are merely schematic. Information may travel through any path or network and travel through any intermediary node.

For example, when a call either is made to or from monitored call participant 306, compliance system 302 is notified of the call. If a connection does not already exist between monitored call participant 306 and compliance system 302, a connection is established between them before a user associated with monitored call participant 306 is able to communicate with another call participant. In some embodiments, a call is made to the compliance system before any user communication is allowed, and the compliance system call is conferenced with both the incoming or outgoing call of a monitored call participant. This allows compliance system 302 to potentially process all information communicated between the call participants. In some embodiments, the compliance system 302 is not conferenced in to a call to/from monitored call participant 306, but equipment associated with monitored call participant 306 is configured to mirror, automatically and transparently to the user, at least a portion of call data associated with a call to/from call participant 306. In some embodiments, compliance system 302 has control over monitored call participant 306. For example, compliance system 302 may filter or block communication desired by monitored call participant 306. In some embodiments, such filtering and/or blocking is implemented by providing on equipment associated with monitored call participant 306 an agent configured to filter and/or block calls in response to control signals sent to the agent by compliance system 302, e.g., as a result of compliance processing performed by compliance system 302 with respect to a call.

Figure 4A:
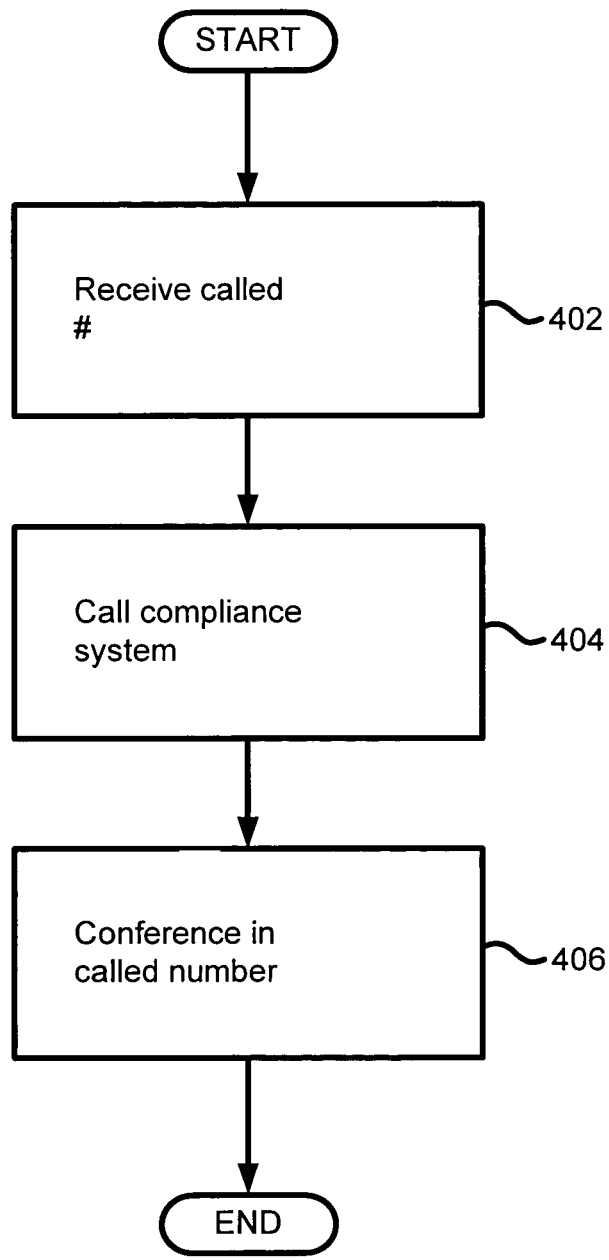
FIG. 4A is a flow chart illustrating an embodiment of a process for establishing a call.

FIG. 4A is a flow chart illustrating an embodiment of a process for establishing a call. The process may be implemented on a device, e.g., telephone equipment, associated with monitored call participant 306 of FIG. 3. At 402, a called number is received. For example, the call number of a destination call participant may be dialed by a user associated with a monitored call participant. At 404, the compliance system is called. At 406, a new call associated with the called number is conferenced in to the call with the compliance system, allowing the compliance system to monitor communication between the call participants.

Figure 4B:
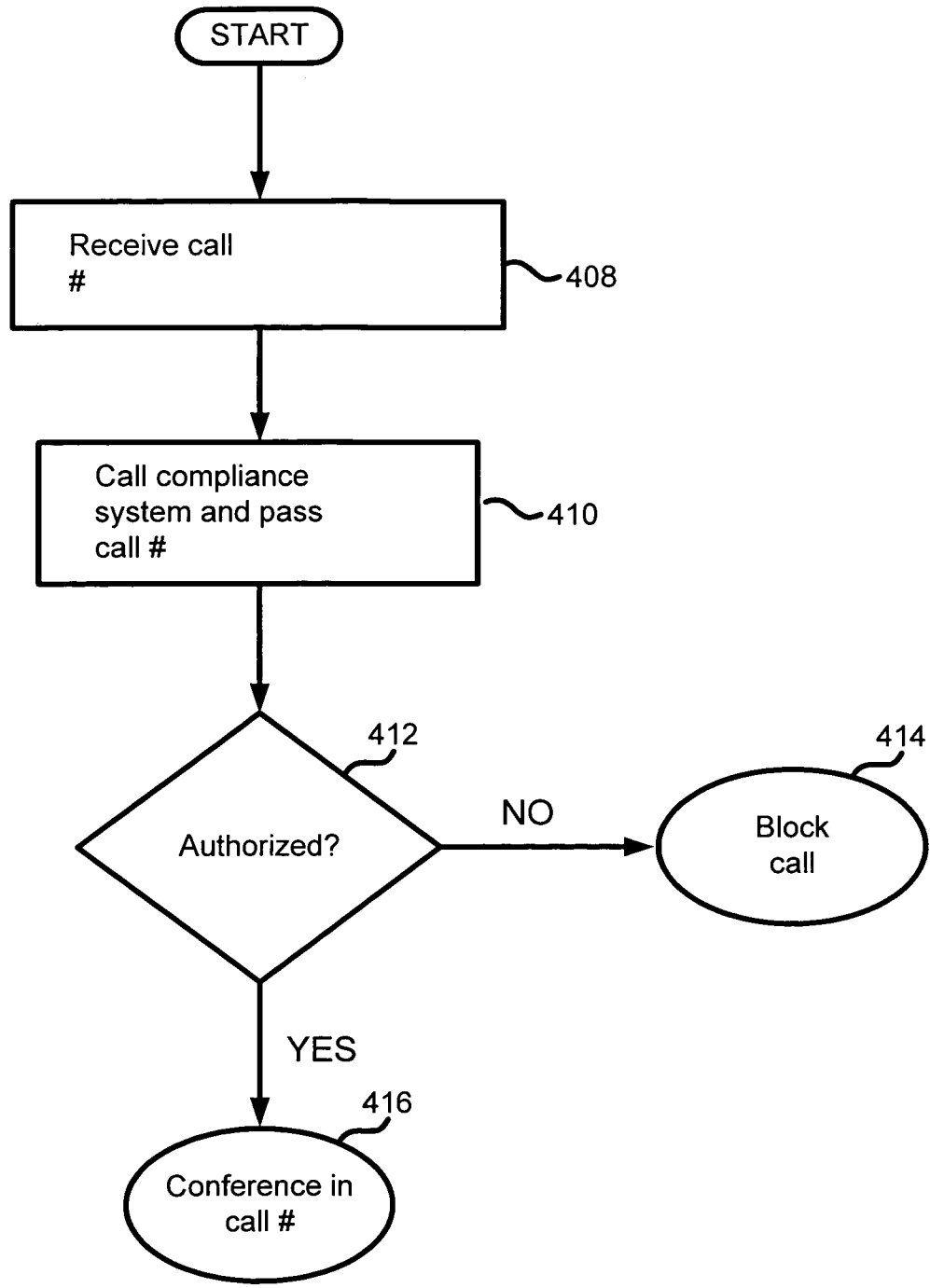
FIG. 4B is a flow chart illustrating an embodiment of a process for blocking a call.

FIG. 4B is a flow chart illustrating an embodiment of a process for blocking a call. The process may be implemented on a device associated with monitored call participant 306 of FIG. 3. At 408, a call number of a call participant is received. The call number may be associated with a destination number of an initiated call request or can be associated with an incoming call requester's call number. At 410, the compliance system is called and the received call number is passed to the compliance system. At 412, the call authorization is determined. In various embodiments, authorization determination may be performed on the compliance system or on a device associated with the monitored call participant. Call authorization includes verifying that the call participants are allowed to communicate with one another according to a communication policy that can be preconfigured and/or dynamically configured. The authorization determination can be made in part by verifying the received call number as authorized. In some embodiments, the authorization determination is made at a remote compliance system and 412 includes receiving from the remote compliance system an indication whether the call is authorized. If at 412 it is determined that the call is not authorized, the call is blocked at 414. If at 412 it is determined that the call is authorized, at 416 the received call number is conferenced in to the call placed to the compliance system at 410, allowing the compliance system to monitor communication between the call participants.

Figure 4C:
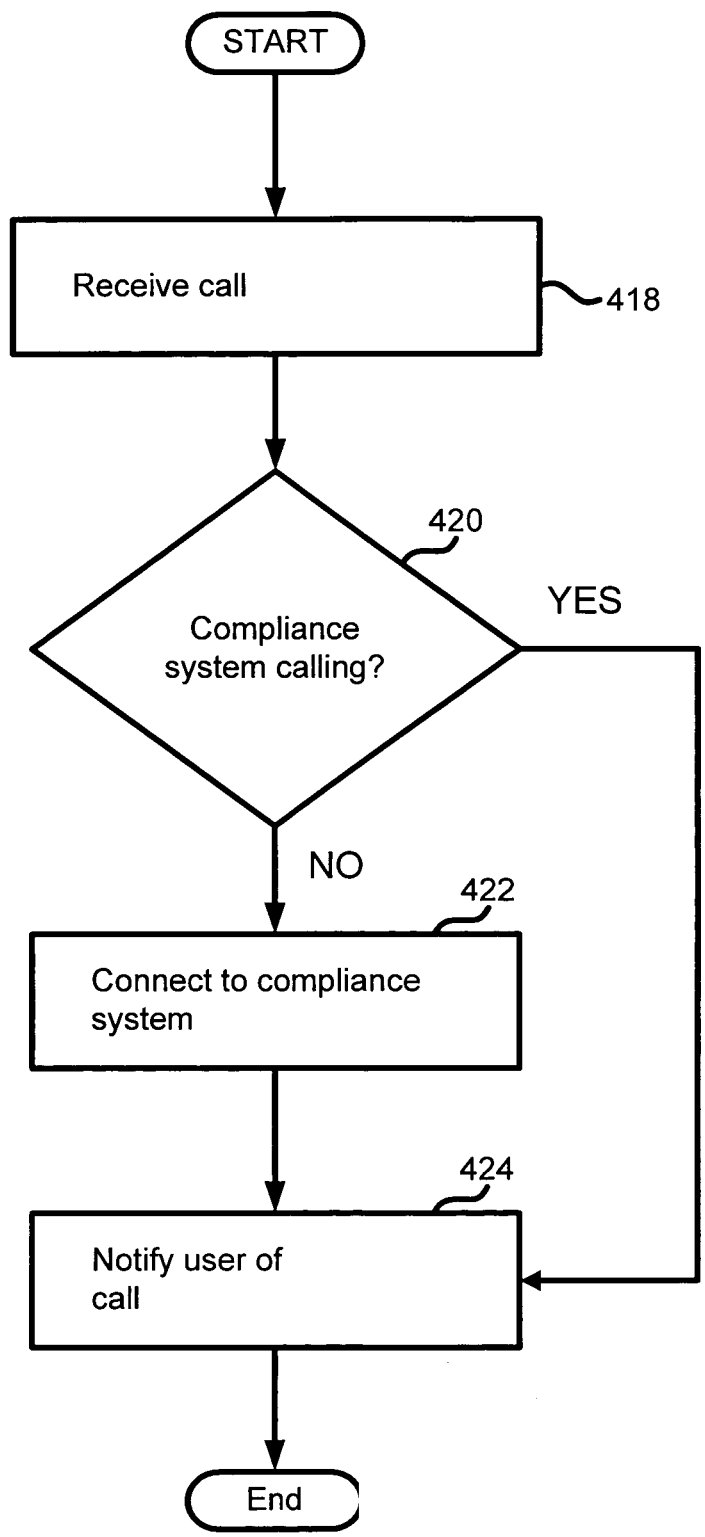
FIG. 4C is a flow chart illustrating an embodiment of a process for receiving a call on a device associated with a monitored call participant.

FIG. 4C is a flow chart illustrating an embodiment of a process for receiving a call on a device associated with a monitored call participant. The process may be implemented on a device associated with monitored call participant 306 of FIG. 3. At 418, a call is received on a device associated with a monitored call participant. If at 420 it is determined that the call is originating from a compliance system, at 424 the user associated with a monitored call participant is notified of the call. In some embodiments, the compliance system may call the device to conference another call participant together with the device. If at 420 it is determined that the call is not originating from a compliance system, at 422 a connection with the compliance system is established. In some embodiments, connecting to the compliance system includes calling the compliance system. In some embodiments, connecting to the compliance system includes conferencing the compliance system in to the call received at 418. In some embodiments, connecting to the compliance system includes passing a calling party number to the compliance system and receiving an indication whether the call is authorized, as in the process of FIG. 4B. At 424, the user associated with the monitored call participant is notified of the call.

Figure 5A:
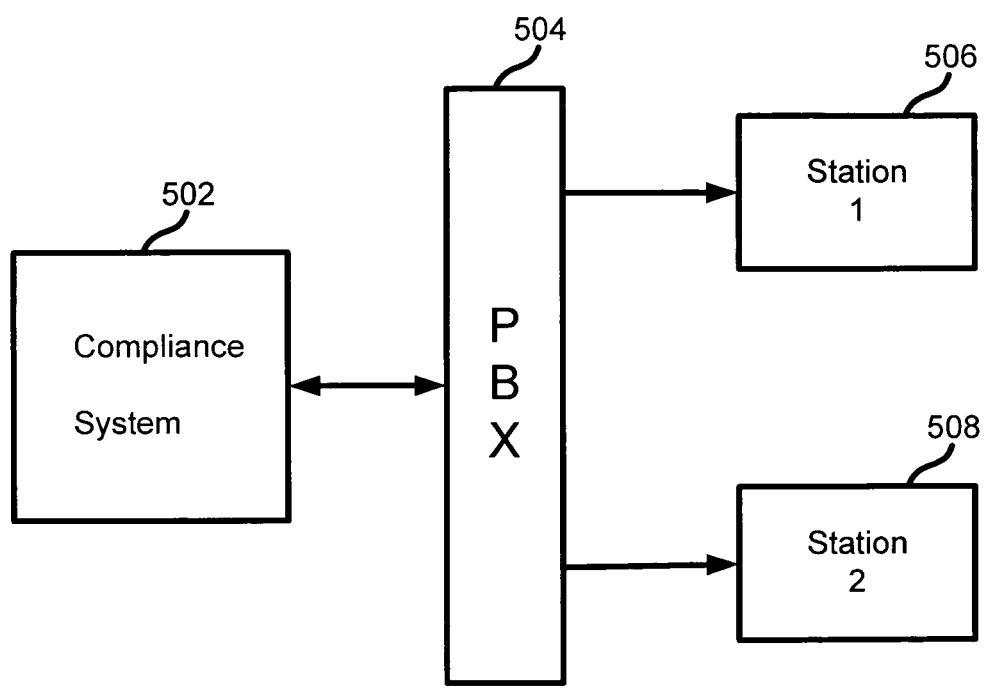
FIG. 5A is a block diagram illustrating an embodiment of a system for compliance processing in a PBX environment.

FIG. 5A is a block diagram illustrating an embodiment of a system for compliance processing in a PBX environment. Compliance system 502, call station 1 (506), and call station 2 (508) are connected to PBX system 504. Call stations can be any terminal that can be used to communicate with another communication participant. Any number of call stations may exist. PBX 504 handles all call routing for all call stations associated with the PBX. Calls within call stations associated with the PBX may be routed and handled by the PBX. PBX can also route calls to an external network connection, e.g., public telephone network. Since the PBX handles all calls for the call stations, compliance system 502 can monitor and perform compliance processing on all calls by monitoring call information routed and handled by the PBX. For example, if an unauthorized call is detected by compliance system 502, compliance system 502 can instruct PBX 504 to not allow the call. In some embodiments, PBX 504 is configured to conference the compliance system in to all (or selected) calls initiated by or placed to call station 1 (506) and/or call station 2 (508). In some embodiments, PBX 504 operates as a normal PBX configured to route a call placed using a public number associated with one of the monitored call stations 1 or 2 to the compliance system 502, which then provides a non-public call number (e.g., internal extension) to PBX 504 to conference in the associated monitored call participant (506 or 508, as applicable, in the example shown). In some embodiments, PBX 504 operates as a normal PBX and a local telephone equipment associated with station 1 or 2 (506 and 508), as applicable, is configured to use PBX 504 to conference compliance system 502 in to any (or selected) calls initiated or received by the associated monitored call station. In some embodiments, calls between monitored call stations 506 and 508 are placed using public internal extension that are associated on PBX 504, which is configured to route all such calls to compliance system 502, which then uses a non-public extension associated with the dialed public extension to conference in the intended call recipient. By utilizing an already existing enterprise controlled equipment, implementing compliance processing is simplified and does not necessarily require that special equipment or services to be obtained from an external service provider such as a local, regional, mobile, or other telephone service provider.

In some embodiments, compliance processing is performed in a compliance processing module that is a part of a call station. Each call station may have built-in compliance processing capabilities. A call station may be connected to an external storage system that can be used during compliance processing or a storage unit may be a part of the call station. A storage system or unit may include any storage medium, including hard drives, optical storage, data tape, audio tape, backup server, and networked storage (e.g., Storage Area Network, Network Attached Storage).

Figure 5B:
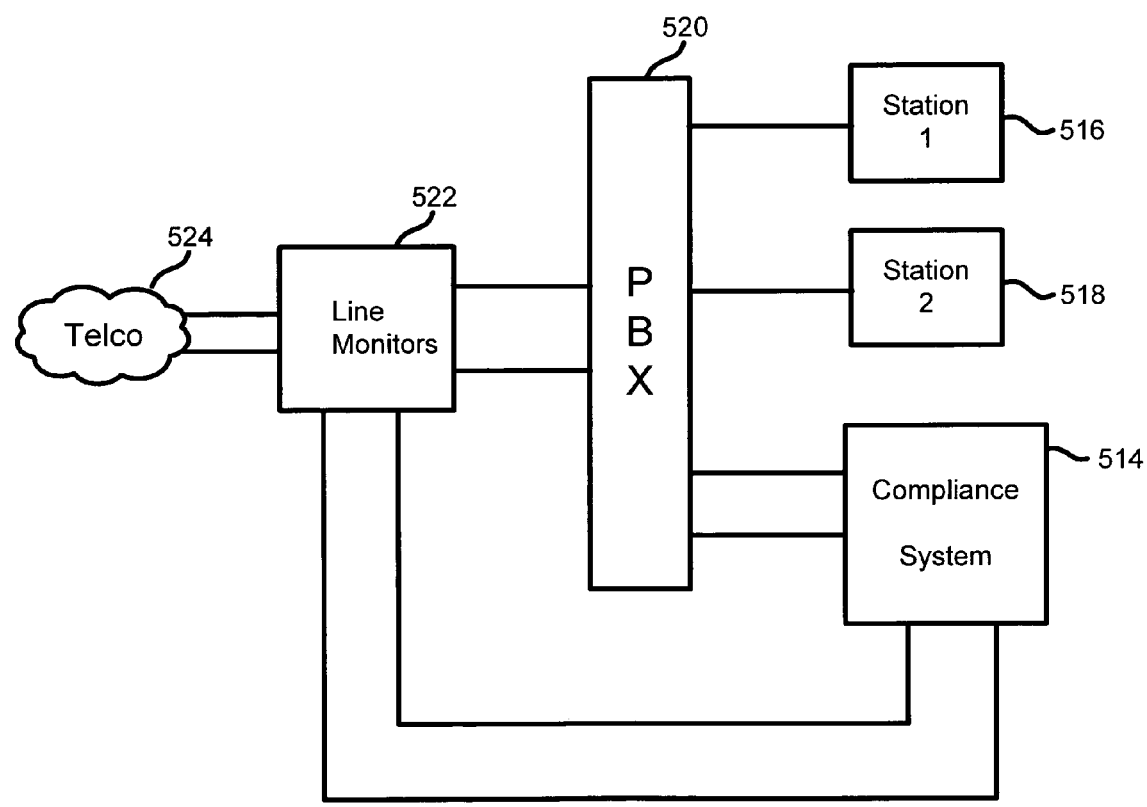
FIG. 5B is a block diagram illustrating an embodiment of a system for compliance processing in a PBX environment, including line monitors.

FIG. 5B is a block diagram illustrating an embodiment of a system for compliance processing in a PBX environment, including line monitors. Compliance system 514, call station 1 (516), and call station 2 (518) are connected to PBX 520. PBX 520 is connected to an external telephone network 524 through line monitors 522. External telephone network can be any telephone network including mobile phone network, public switched telephone network, telephone network, and/or Voice-over-IP network. Any number of connections to one or more external telephone networks may exist, and in some embodiments each such connection may one or more line monitors associated with it. Compliance system 514 is configured in some embodiments to monitor and process all (or selected) calls to and from any call station associated with the PBX by monitoring call information passing through the PBX. In some embodiments, line monitors are physically remote from the compliance system. Data is exchanged between the line monitors and the compliance system through a connection between them. For example, line monitors may relay line state and ANI information to the compliance system. In the event of either line monitor or compliance system cannot provide monitoring service, line monitors can interrupt telephony service by being set to fail open or fail closed. Line monitors 522 can be controlled by compliance system 514. Line monitors can block, filter, and monitor any information on the communication line connection. For example, if a call not authorized by the compliance system is detected by the line monitors (e.g., when a communication line is "hot" due to a malicious attempt to bypass compliance processing), the unauthorized call information can be blocked by the line monitors.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of receiving a communication, comprising:
receiving, at a line monitor between a Private Branch Exchange (PBX) device and an external telephone network, a request from a second communication participant to establish communication, wherein the request includes a public alphanumeric call number associated with a first communication participant;
using the line monitor to automatically establish a connection with a compliance node in response to receiving the request that includes the public alphanumeric call number, wherein:
the line monitor sends line state and Automatic Number Identification (ANI) information to the compliance node; and
the connection with the compliance node is transparent to at least the second communication participant;
sending, from the compliance node to the PBX device, a non-public alphanumeric call number associated with the first communication participant, wherein the compliance node stores a mapping from the public alphanumeric call number associated with the first communication participant to the non-public alphanumeric call number associated with the first communication participant;
after the connection with the compliance node is established, using the PBX device to include the first communication participant in a 3-way call between the first communication participant, the second communication participant, and the compliance node by conferencing in the first communication participant using the non-public alphanumeric call number received from the compliance node; and
providing to the compliance node at least a portion of the communication between the first and second communication participants, wherein the compliance node performs compliance processing with respect to said at least a portion of the communication between the first and second communication participants.

2. A method as recited in claim 1, wherein providing to the compliance node at least a portion of the communication between the first and second communication participants includes establishing a communication session in which the compliance node, the first communication participant, and the second communication participant are participants.

3. A method as recited in claim 1, wherein providing to the compliance node at least a portion of the communication between the first and second communication participants includes mirroring to the compliance node said at least a portion of the communication between the first and second communication participants.

4. A method as recited in claim 1, wherein compliance processing includes one or more of: monitoring, recording, archiving, indexing, retrieving, analyzing, controlling, blocking, and modifying communication information.

5. A method as recited in claim 1, wherein the communication comprises one or more of the following: voice data including conversation content and tone/character/accent/gender of voice, background call noise, data associated with devices of with call participants, data associated with communication service providers, data associated with routing devices, data associated with other devices associated with a compliance system, and any audible or binary data associated with the call.

6. A method as recited in claim 1, wherein compliance processing includes blocking or modifying the communication according to a call blocking policy based at least in part on one or more of the following: a list of allowed call participants, a list of non-allowed call participants, a list of allowed call participant groupings, and a list of non-allowed call participant groups.

7. A method as recited in claim 1, wherein compliance processing includes storing data associated with the communication according to an archive policy on a storage medium.

8. A method as recited in claim 7, wherein the storage medium includes one or more of the following: a hard drive, optical storage, a data tape, an audio tape, a backup server, a networked storage, a Storage Area Network, and a Network Attached Storage.

9. A method as recited in claim 7, wherein storing data further includes one or more of the following: information conversion, audio digitalization, voice to text translation, encoding format conversion, data filtering, data compression, and data encryption.

10. A method as recited in claim 1 further comprising:
receiving a second request from the second communication participant to establish communication, wherein the second request includes the non-public alphanumeric call number;
in response to receiving the second request, determining whether the second communication participant is the compliance node;
establishing a connection to the first communication participant in the event it is determined the second communication participant is the compliance node; and
refraining from establishing a connection to the first communication participant in the event it is determined the second communication participant is not the compliance node.

11. A method as recited in claim 1, wherein:
the request from the second communication participant to establish communication is received the PBX device; and
automatically establishing the connection with the compliance node includes using the PBX device to automatically establish the connection with the compliance node.

12. A computer program product for receiving a communication, the computer program product being embodied in a non-transitory computer readable storage medium and comprising computer instructions for:
receiving, at a line monitor between a Private Branch Exchange (PBX) device and an external telephone network, a request from a second communication participant to establish communication, wherein the request includes a public alphanumeric call number associated with a first communication participant;
using the line monitor to automatically establish a connection with a compliance node in response to receiving the request that includes the public alphanumeric call number, wherein:
the line monitor sends line state and Automatic Number Identification (ANI) information to the compliance node; and
the connection with the compliance node is transparent to at least the second communication participant;
sending, from the compliance node to the PBX device, a non- public alphanumeric call number associated with the first communication participant, wherein the compliance node stores a mapping from the public alphanumeric call number associated with the first communication participant to the non-public alphanumeric call number associated with the first communication participant;

after the connection with the compliance node is established, using the PBX device to include the first communication participant in a 3-way call between the first communication participant, the second communication participant, and the compliance node by conferencing in the first communication participant using the non-public alphanumeric call number received from the compliance node; and providing to the compliance node at least a portion of the communication between the first and second communication participants, wherein the compliance node performs compliance processing with respect to said at least a portion of the communication between the first and second communication participants.

13. A computer program product as recited in claim 12, wherein the computer instructions for providing to the compliance node at least a portion of the communication between the first and second communication participants include computer instructions for establishing a communication session in which the compliance node, the first communication participant, and the second communication participant are participants.

14. A computer program product as recited in claim 12, wherein the computer instructions for providing to the compliance node at least a portion of the communication between the first and second communication participants include computer instructions for mirroring to the compliance node said at least a portion of the communication between the first and second communication participants.

15. A computer program product as recited in claim 12, wherein the computer instructions for establishing a connection with the compliance node include computer instructions for establishing a new call to an external compliance system.

16. A computer program product as recited in claim 12, wherein compliance processing includes one or more of: monitoring, recording, archiving, indexing, retrieving, analyzing, controlling, blocking, and modifying communication information.

17. A computer program product as recited in claim 12, wherein the communication comprises one or more of the following: voice data including conversation content and tone/character/accent/gender of voice, background call noise, data associated with devices of with call participants, data associated with communication service providers, data associated with routing devices, data associated with other devices associated with a compliance system, and any audible or binary data associated with the call.

18. A computer program product as recited in claim 12, wherein compliance processing includes blocking or modifying the communication according to a call blocking policy based at least in part on one or more of the following: a list of allowed call participants, a list of non-allowed call participants, a list of allowed call participant groupings, and a list of non-allowed call participant groups.

19. A computer program product as recited in claim 12 further comprising computer instructions for:

receiving a second request from the second communication participant to establish communication, wherein the second request includes the non-public alphanumeric call number;

in response to receiving the second request, determining whether the second communication participant is the compliance node;

establishing a connection to the first communication participant in the event it is determined the second communication participant is the compliance node; and refraining from establishing a connection to the first communication participant in the event it is determined the second communication participant is not the compliance node.

20. A computer program product as recited in claim 12, wherein:

the request from the second communication participant to establish communication is received the PBX device; and the computer instructions for automatically establishing the connection with the compliance node include computer instructions for using the PBX device to automatically establish the connection with the compliance node.

21. A communication system, comprising:

a processor; and a memory coupled with the processor, wherein the memory is configured to provide the processor with instructions which when executed cause the processor to:

receive, at a line monitor between a Private Branch Exchange (PBX) device and an external telephone network, a request from a second communication participant to establish communication, wherein the request includes a public alphanumeric call number associated with a first communication participant;

use the line monitor to automatically establish a connection with a compliance node in response to receiving the request that includes the public alphanumeric call number, wherein:

the line monitor sends line state and Automatic Number Identification (ANI) information to the compliance node; and the connection with the compliance node is transparent to at least the second communication participant;

send, from the compliance node to the PBX device, a non-public alphanumeric call number associated with the first communication participant, wherein the compliance node stores a mapping from the public alphanumeric call number associated with the first communication participant to the non-public alphanumeric call number associated with the first communication participant;

after the connection with the compliance node is established, use the PBX device to include the first communication participant in a 3-way call between the first communication participant, the second communication participant, and the compliance node by conferencing in the first communication participant using the non-public alphanumeric call number received from the compliance node; and provide to the compliance node at least a portion of the communication between the first and second communication participants, wherein the compliance node performs compliance processing with respect to said at least a portion of the communication between the first and second communication participants.

22. A communication system as recited in claim 21, wherein compliance processing includes storing data associated with the communication according to an archive policy on a storage medium.

23. A communication system as recited in claim 22, wherein the storage medium includes one or more of the following: a hard drive, optical storage, a data tape, an audio tape, a backup server, a networked storage, a Storage Area Network, and a Network Attached Storage.

24. A communication system as recited in claim 22, wherein storing data further includes one or more of the following: information conversion, audio digitalization, voice to text translation, encoding format conversion, data filtering, data compression, and data encryption.

25. A communication system as recited in claim 21, wherein the memory is further configured to provide the processor with instructions to:
receive a
second request from the second communication participant to establish communication, wherein the second request includes the non-public alphanumeric call number;
in response to receiving the second request, determine whether the second communication participant is the compliance node;
establish a connection to the first communication participant in the event it is determined the second communication participant is the compliance node; and
refrain from establishing a connection to the first communication participant in the event it is determined the second communication participant is not the compliance node.

26. A communication system as recited in claim 21, wherein:
the request from the second communication participant to establish communication is received the PBX device; and
the instructions provided by the memory for automatically establishing the connection with the compliance node include instructions for using the PBX device to automatically establish the connection with the compliance node.

* * * * *